US008089252B2

(12) United States Patent
Lu

(10) Patent No.: US 8,089,252 B2

(45) Date of Patent: Jan. 3, 2012

(54) ARMATURE WINDING SWITCH MODULE AND SWITCHING DEVICE THEREOF

(75) Inventor: Wen-Feng Lu, Kaohsiung (TW)

(73) Assignee: Kutai Electronics Industry Co., Ltd., Kaohsiung (TW)

( * ) Notice: Subject to any disclaimer, the term of this patent is extended or adjusted under 35 U.S.C. 154(b) by 438 days.

(21) Appl. No.: 12/471,649

(22) Filed: May 26, 2009

(65) Prior Publication Data

US 2010/0300860 A1 Dec. 2, 2010

(51) Int. Cl.
*H02P 9/00* (2006.01)
*H01H 9/26* (2006.01)

(52) U.S. Cl. ....... 322/25; 322/93; 200/50.32; 200/50.33

(58) Field of Classification Search ...... 200/50.32–50.4, 200/1 R, 1 V, 18, 500, 501, 330, 331; 310/200; 322/90, 93, 25, 63
See application file for complete search history.

(56) References Cited

U.S. PATENT DOCUMENTS

| | | | | | |
|---|---|---|---|---|---|
| 4,233,555 | A | * | 11/1980 | Roche | 322/25 |
| 5,200,586 | A | * | 4/1993 | Smith et al. | 200/50.32 |
| 5,293,518 | A | * | 3/1994 | Wilson | 318/400.42 |
| 5,714,821 | A | * | 2/1998 | Dittman | 310/179 |
| 5,886,311 | A | * | 3/1999 | Morel et al. | 200/17 R |
| 6,528,745 | B1 | * | 3/2003 | Lathrop et al. | 200/50.32 |
| 6,576,851 | B1 | * | 6/2003 | Barlian et al. | 200/5 R |
| 6,995,546 | B2 | * | 2/2006 | Fujikawa | 322/93 |
| 7,402,766 | B1 | * | 7/2008 | Jonas et al. | 200/50.33 |
| 7,462,792 | B1 | * | 12/2008 | Hellmers et al. | 200/50.33 |
| 2008/0106155 | A1 | * | 5/2008 | Yamada et al. | 310/12 |

* cited by examiner

*Primary Examiner* — Michael Friedhofer

(74) *Attorney, Agent, or Firm* — Fabin & Berdo, P.C.

(57) ABSTRACT

An armature winding switch module has a first connection set, a second connection set and a third connection set. The first, the second and the third connection set are respectively connected between a neutral point and a corresponding phase line point and have terminals and contacts. Each two terminals of each connection set are respectively connected to two ends of a corresponding armature winding of a power supply device. The contacts of each connection set are connected among the corresponding terminals. Selectively turning on/off the contacts can connect the armature windings of each connection set in series or in parallel and thereby output required voltage without redoing wiring work. Therefore the present invention avoids second time complicated wiring work and possible connection faults.

7 Claims, 13 Drawing Sheets

ARMATURE WINDING SWITCH MODULE AND SWITCHING DEVICE THEREOF

BACKGROUND OF THE INVENTION

1. Field of the Invention

The present invention relates to an armature winding switch module, especially to an armature winding switch module and a switching device thereof, wherein manually operating circuit breakers of the switching device can change wire connections among armature windings of a power supply device to output desired voltage value.

2. Description of the Related Art

Generally speaking, construction sites or factories sometimes need electricians to configure wiring of power supply device to output a suitable voltage for machine operation. However, the electricians may renovate the wiring work of the power supply device to output another voltage value since different machines may require different operation voltages. Arrangement of wires inside the power supply device is often disordered and thereby redoing wiring work is often time-consuming. Furthermore, once connection faults take place due to such frequent rewiring, running the power supply device may be dangerous.

To overcome the shortcomings, the present invention provides an armature winding switch module and a switching device thereof to mitigate or obviate the aforementioned problems.

SUMMARY OF THE INVENTION

The main objective of the invention is to provide an armature winding switch module and a switching device thereof, wherein manually operating circuit breakers of the switching device can change wire connections among armature windings of a power supply device to output desired voltage value.

The armature winding switch module in accordance with the present invention has a neutral point, a primary phase line point, a secondary phase line point, a tertiary phase line point, a first connection set, a second connection set and a third connection set.

The first connection set is connected between the neutral point and the primary phase line point and has four first terminals and three first contacts. Each two first terminals are respectively connected to two ends of a corresponding first armature winding. The first contacts are connected among the first terminals.

The second connection set is connected between the neutral point and the secondary phase line point and has four second terminals and three second contacts. Each two second terminals are respectively connected to two ends of a corresponding second armature winding. The second contacts are connected among the second terminals.

The third connection set is connected between the neutral point and the tertiary phase line point and has four third terminals and three third contacts. Each two third terminals are respectively connected to two ends of a corresponding third armature winding. The third contacts are connected among the third terminals.

The first, second and third contacts operate together to synchronously and respectively connect the first, second and third armature windings in series or in parallel.

The switching device in accordance with the present invention comprises a base, a first circuit breaker, a second circuit breaker, a third circuit breaker, multiple lever controllers and a control handle.

The first circuit breaker is mounted on the base and has a first contact, a second contact, a third contact and a first lever. The first lever synchronously turns on or off the first, the second and the third contacts.

The second circuit breaker is mounted on the base beside the first circuit breaker and has a fourth contact, a fifth contact, a sixth contact and a second lever. The fourth contact has a front end connected to a frond end of the first contact. Front ends of the fourth, the fifth, the sixth contacts respectively connected to front ends of the first, the second and the third contacts. The second lever synchronously turns on or off the fourth, the fifth and the sixth contacts wherein the second lever moves opposite to the first lever.

The third circuit breaker is mounted on the base beside the second circuit breaker and has a seventh contact, an eighth contact, a ninth contact and a third lever. Front ends of the seventh, the eighth, the ninth contacts are connected to each other to jointly form a neutral point of an armature winding switch module. Back ends of the seventh, the eighth, the ninth contacts are respectively connected to back ends of the fourth, the fifth and the sixth contacts. The third lever synchronously turns on or off the seventh, the eighth and the ninth contacts wherein the second lever moves the same with the first lever but opposite to the second lever.

The lever controllers mesh with each other, are respectively mounted on the first, second and third circuit breakers and respectively control the first, second and third lever.

The control handle is connected to one of the lever controllers and synchronously drives all the lever controllers.

Users can easily switch the connection type of armature windings of a power supply device by operating the control handle to make the power supply device output a desired voltage without redoing wiring work. Therefore the invention avoids second time complicated wiring work and possible connection faults.

Other objectives, advantages and novel features of the invention will become more apparent from the following detailed description when taken in conjunction with the accompanying drawings.

BRIEF DESCRIPTION OF THE DRAWINGS

FIG. 11 is a cross sectional side view of the switching device showing relative positions between a brake shaft and a circuit breaker when contact of the circuit breaker is turned on;

DETAILED DESCRIPTION OF THE PREFERRED EMBODIMENTS

Figure 1:
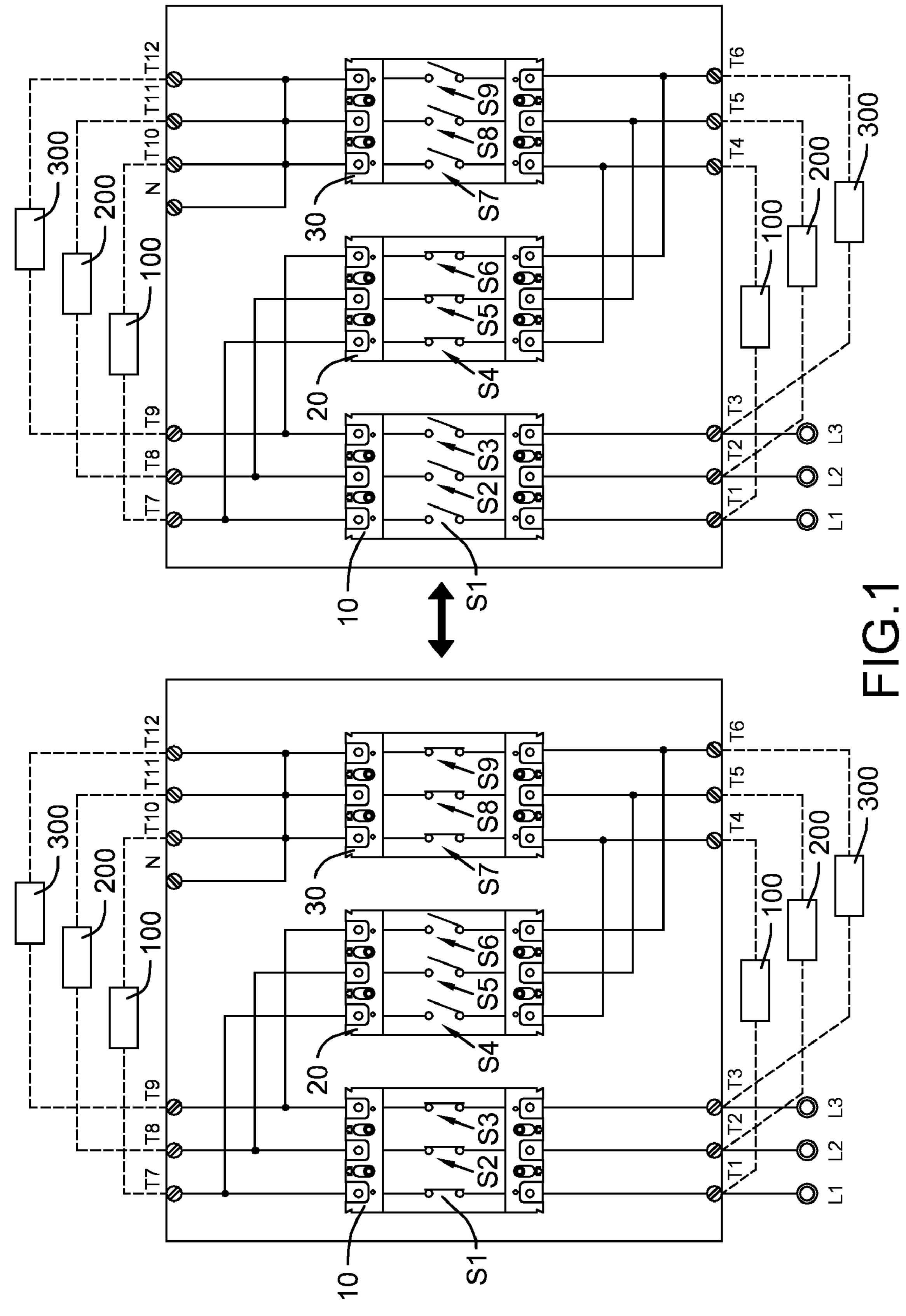
FIG. 1 is a connection diagram of an armature winding switch module in accordance with the present invention showing switching types of contacts.
Figure 2:
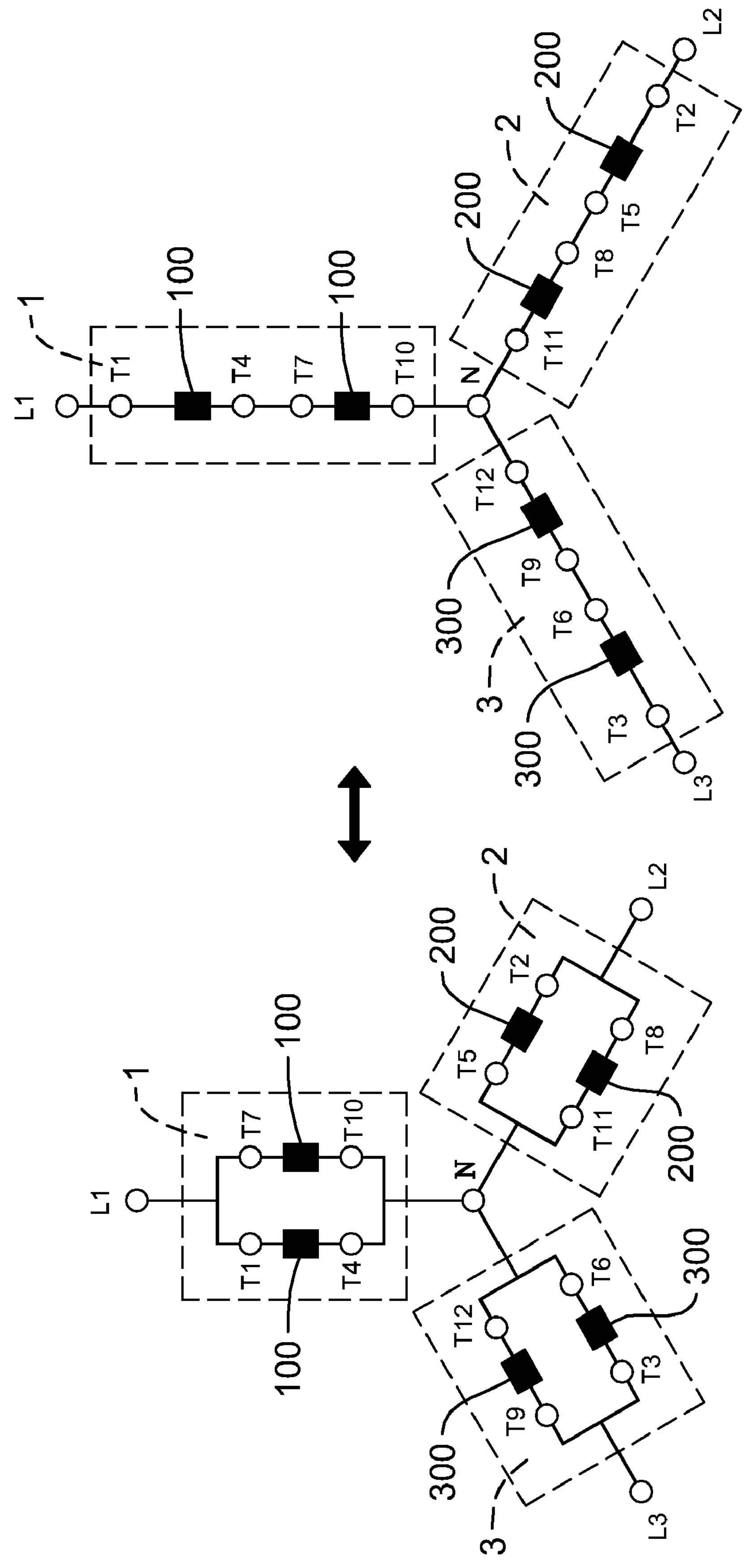
FIG. 2 is simplified diagram showing switch modes of the armature winding switch module in FIG. 1.
Figure 3:
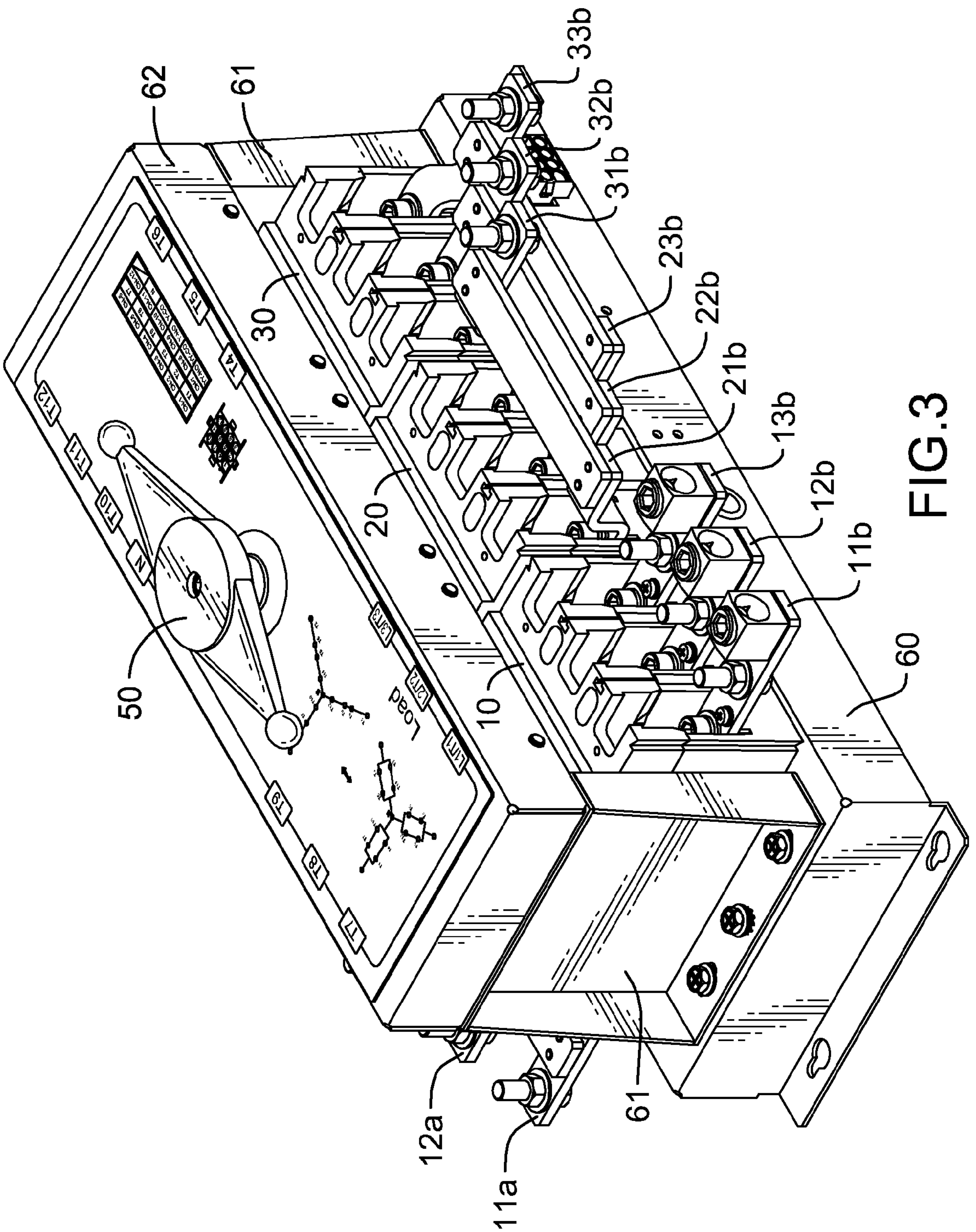
FIG. 3 is a perspective front view of a switching device embodying the armature winding switch module in FIG. 1.
Figure 4:
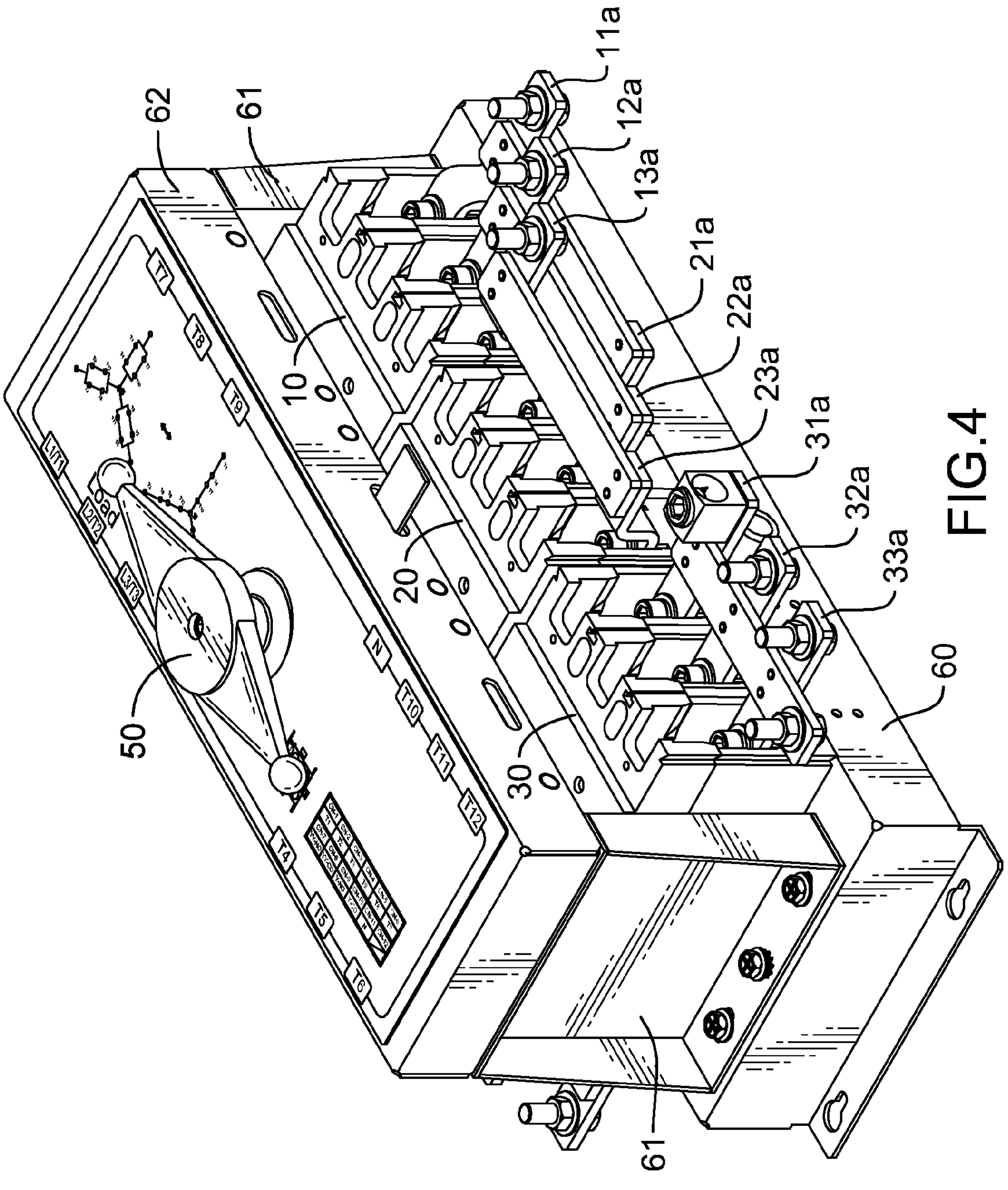
FIG. 4 is a perspective back view of the switching device in FIG. 3.
Figure 5:
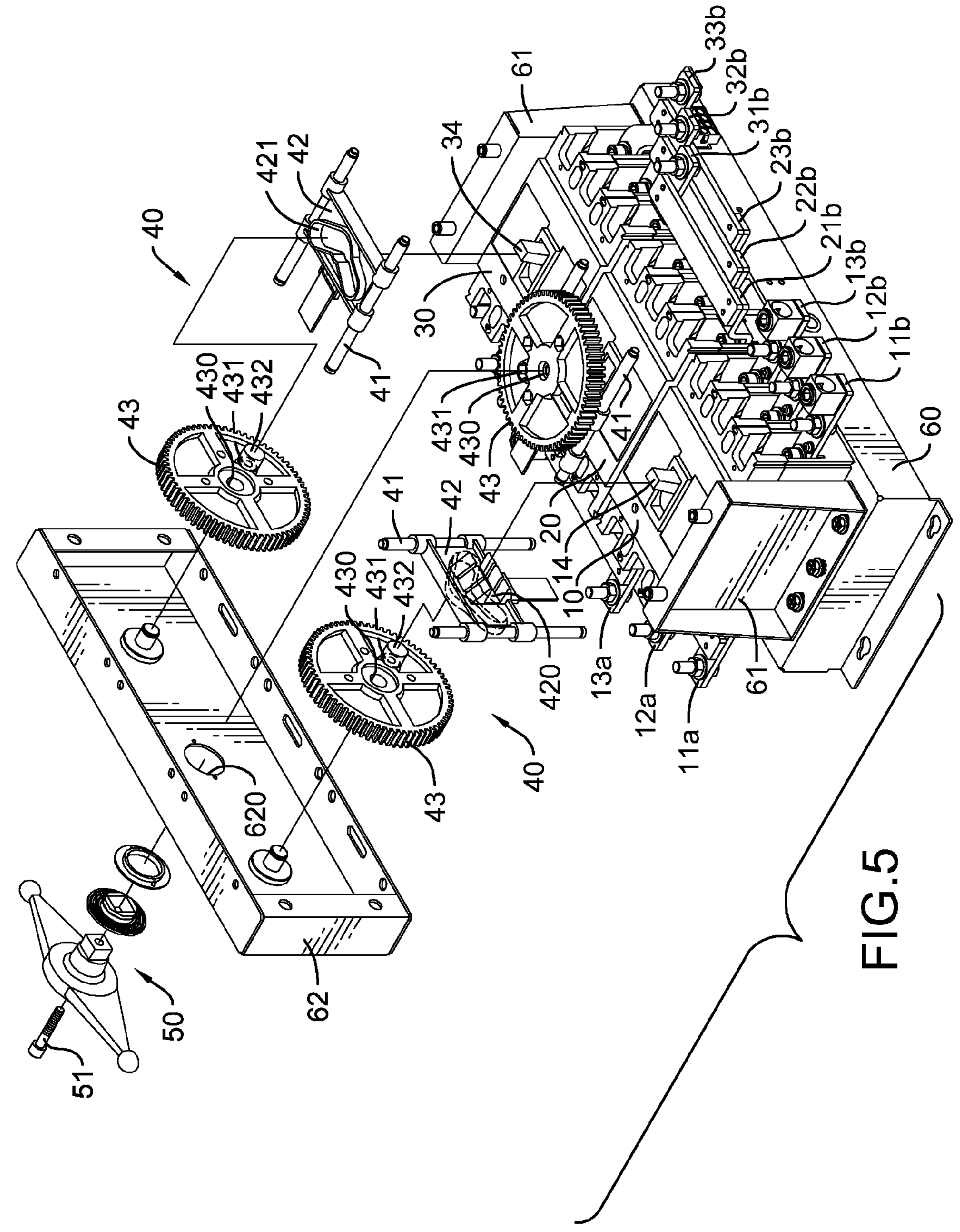
FIG. 5 is a partial exploded perspective of the switching device in FIG. 3.
Figure 6:
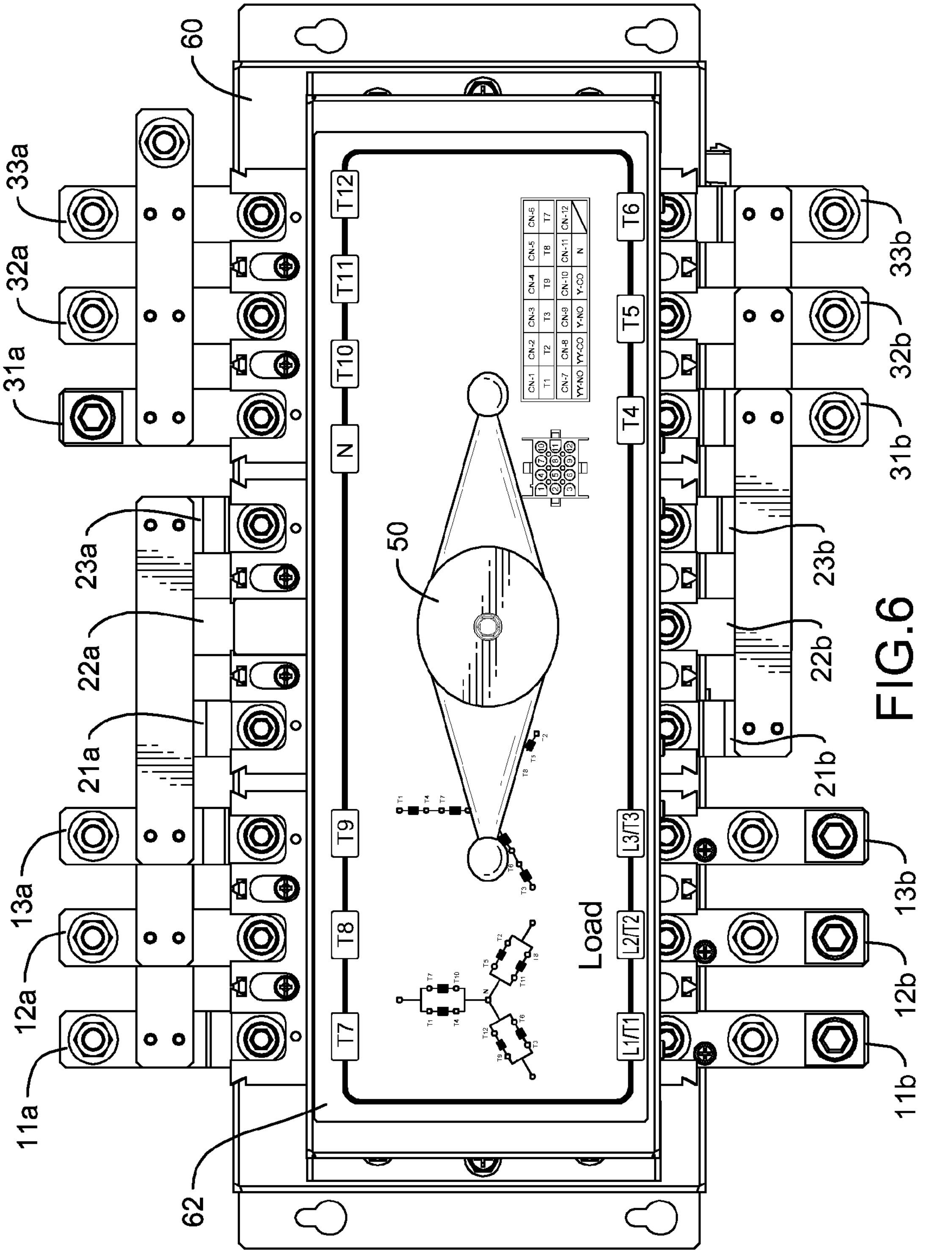
FIG. 6 is a top view of the switching device in FIG. 3.
Figure 7:
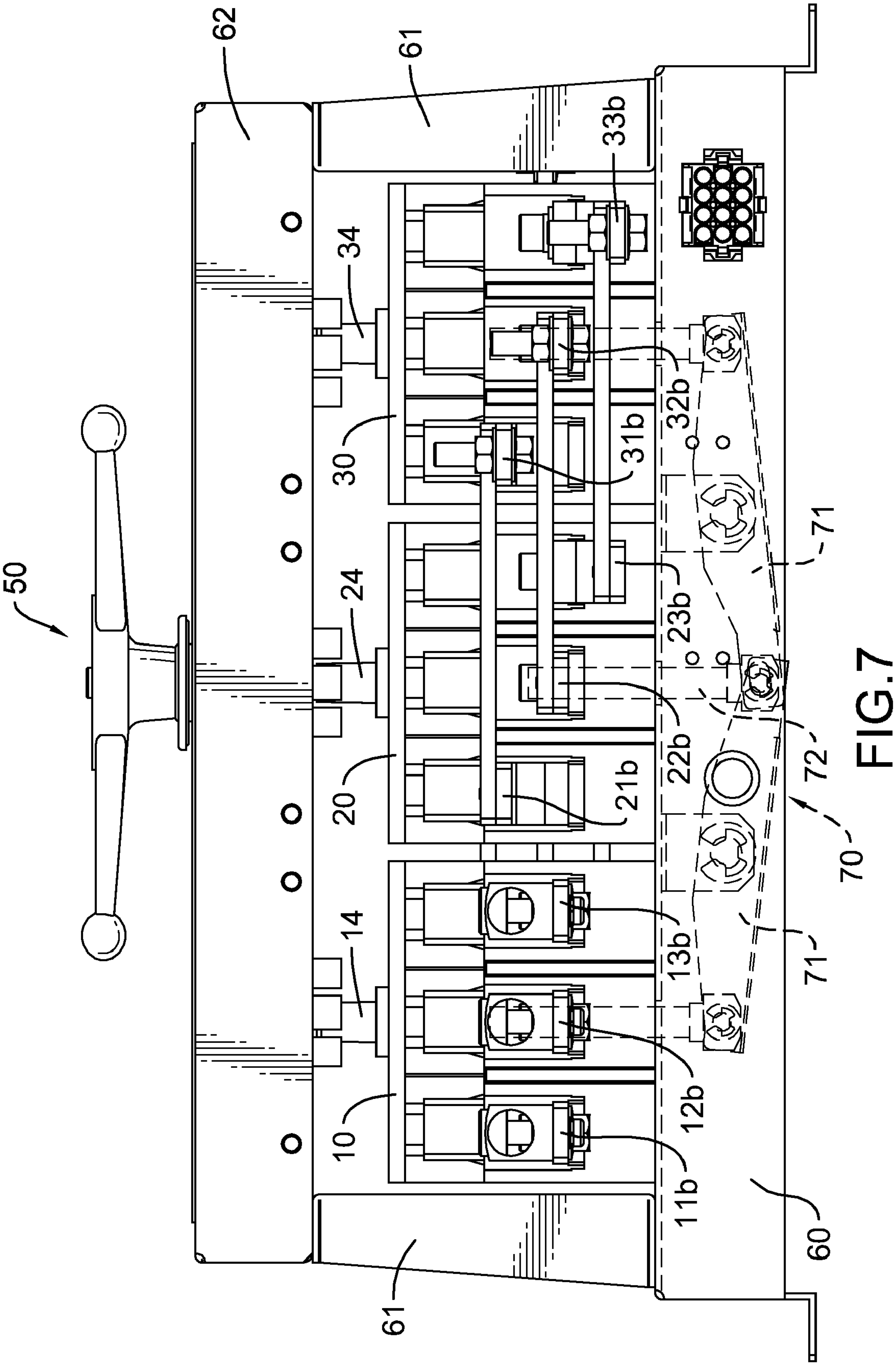
FIG. 7 is front view of the switching device in FIG. 3 showing an operational status of a switch brake assembly with broken lines.

With reference to FIGS. 1 and 2, an armature winding switch module in accordance with the present invention is used for changing output voltages of a power supply device that provides three-phase power source. Said power supply device may has multiple armature windings and preferably has two first armature windings (100), two second armature windings (200) and two third armature windings (300). The armature winding switch module comprises a neutral point (N), a primary phase line point (L1), a secondary phase line point (L2), a tertiary phase line point (L3), a first connection set (1), a second connection set (2) and a third connection set (3).

The first connection set (1) is connected between the neutral point (N) and the primary phase line point (L1) and has four first terminals (T1, T4, T7, T10) and three first contacts (S1, S4, S7). Each two first terminals (T1, T4)(T7, T10) are respectively connected to two ends of a corresponding first armature winding (100). The first contacts (S1, S4, S7) are connected among the first terminals (T1, T7)(T7, T4)(T4, T10). The first contacts (S1, S4, S7) can be selectively turned on or off and thereby connect the first armature windings (100) in series or in parallel, wherein switch action of the first contact (S4) is opposite to the other first contacts (S1, S7).

The second connection set (2) is connected between the neutral point (N) and the secondary phase line point (L2) and has four second terminals (T2, T5, T8, T11) and three second contacts (S2, S5, S8). Each two second terminals (T2, T5) (T8, T11) are respectively connected to two ends of a corresponding second armature windings (200). The second contacts (S2, S5, S8) are connected among the second terminals (T2, T8)(T8, T5)(T5, T11). The second contacts (S2, S5, S8) can be selectively turned on or off and thereby connect the second armature windings (200) in series or in parallel. The second contacts (S2, S5, S8) operate synchronously with the first contacts (S1, S4, S7), wherein switch action of the second contact (S5) is the same with the first contact (S4) but opposite to the other second contacts (S2, S8) and first contacts (S1, S7).

The third connection set (3) is connected between the neutral point (N) and the tertiary phase line point (L3) and has four third terminals (T3, T6, T9, T12) and three third contacts (S3, S6, S9). Each two third terminals (T3, T6)(T9, T12) are respectively connected to two ends of a corresponding third armature windings (300). The third contacts (S2, S5, S8) are connected among the third terminals (T3, T9)(T9, T6)(T6, T12). The third contacts (S3, S6, S9) can be selectively turned on or off and thereby connect the third armature windings (300) in series or in parallel. The third contacts (S3, S6, S9) operate synchronously with the first contacts (S1, S4, S7) and the second contacts (S2, S5, S8), wherein switch action of the second contact (S6) is the same with the first contact (S4) and the second contact (S5) but opposite to the other third contacts (S3, S9), second contacts (S2, S8) and first contacts (S1, S7).

With foregoing switch module, connection of the armature windings of the power supply device can be chose to connect in Y connection or YY connection. Hence the output voltage of the power supply device may be transferred back and forth between two values.

With further reference to FIGS. 3 to 7, a switching device that embodies foregoing armature winding switch module comprises a base (60), two optional side panels (61), a first circuit breaker (10), a second circuit breaker (20), a third circuit breaker (30), multiple lever controllers (40), an optional cover (62) and a control handle (50).

The side panels (61) are respectively mounted on two opposite sides of the base (60).

The first circuit breaker (10) is mounted on the base (60) and has a first contact, a second contact, a third contact and a first lever (14). The first, the second and the third contacts respectively function as the first, the second and the third contacts (S1, S2, S3) of the armature winding switch module in FIG. 1 and respectively have a front end (11*a*, 12*a*, 13*a*) and a back end (11*b*, 12*b*, 13*b*). The first lever (14) synchronously turns on or off the first, the second and the third contacts.

Similarly, the second circuit breaker (20) is mounted on the base (60) beside the first circuit breaker (10) and has a fourth contact, a fifth contact, a sixth contact and a second lever (24). The fourth, the fifth, the sixth contacts respectively function as the first, the second and the third contacts (S4, S5, S6) in FIG. 1 and respectively have a front end (21*a*, 22*a*, 23*a*) and a back end (21*b*, 22*b*, 23*b*). The front ends (21*a*, 22*a*, 23*a*) are respectively connected to the front ends (11*a*, 12*a*, 13*a*) of the first, the second and the third contacts. The second lever (24) synchronously turns on or off the fourth, the fifth and the sixth contacts wherein the second lever (24) moves opposite to the first lever (14).

The third circuit breaker (30) is mounted on the base (60) beside the second circuit breaker (20) and has a seventh contact, an eighth contact, a ninth contact and a third lever (34). The seventh, the eighth, the ninth contacts respectively function as the first, the second and the third contact (S7, S8, S9) of the armature winding switch module in FIG. 1 and respectively have a front end (31*a*, 32*a*, 33*a*) and a back end (31*b*, 32*b*, 33*b*). The front ends (31*a*, 32*a*, 33*a*) are connected to each other to jointly function as the neutral point of the armature winding switch module in FIG. 1. The back ends (31*b*, 32*b*, 33*b*) are respectively connected to the back ends (21*b*, 22*b*, 23*b*) of the fourth, the fifth and the sixth contacts. The third lever (34) synchronously turns on or off the seventh, the eighth and the ninth contacts wherein the second lever (34) moves the same with the first lever (14) but opposite to the second lever (24).

The lever controllers (40) mesh with each other, are respectively mounted on the first, second and third circuit breakers (10, 20, 30) and respectively control the first, second and third lever (14, 24, 34). Each of the lever controllers (40) may have a slide rail (41), a slider (42) and a gear (43). The slider (42) is mounted on the slide rail (41), able to slide along the slide rail (41) and has a top surface, a bottom surface, a recess (420), a V-shaped ring (421). The recess (420) is formed on the bottom surface and correspondingly meshed with a corresponding lever (14, 24, 34). The V-shaped ring (421) is formed on the top surface of the slider (42). The gear (43) is mounted upon the slide rail (41), is rotatable and has an axle center (430), an eccentric axis (431) and a post (432). The eccentric axis (431) is formed adjacent to the axle center (430). The post (432) is formed on and extends downward from the eccentric axis (431) into the V-shaped ring (421).

The cover (62) is mounted on tops of the side panel (61) and covers the lever controllers (40) and has a through hole (620).

The control handle (50) is connected to one of the lever controllers (40) and synchronously drives all the lever controllers (40) since the lever controllers (40) mesh with each other. The control handle (50) may be rotatable and mounted on the cover (62) and have a shaft (51). The shaft (51) may be mounted through the through hole (620) of the cover (62) and connected to the axle center (430) of one of the gears (43) of the lever controllers (40) so as to drive the gear (43) by rotation.

Foregoing structure of the switching device can satisfy the function of armature winding switch module. The front ends (11_a_, 12_a_, 13_a_) of the first circuit breaker (10) respectively function as the terminals (T7, T8, T9) in FIG. 1. The back ends (11_b_, 12_b_, 13_b_) of the first circuit breaker (10) respectively function as the terminals (T1, T2, T3). The front ends (31_a_, 32_a_, 33_a_) of the third circuit breaker (30) respectively function as the terminals (T10, T11, T12) in FIG. 1. The back ends (31_b_, 32_b_, 33_b_) of the third circuit breaker (30) respectively function as the terminals (T4, T5, T6). Junction of the front ends (31_a_, 32_a_, 33_a_) functions as the neutral point (N).

When a user switches the control handle (50), the control handle (50) drives the gear (43) of the corresponding lever controllers (40) and indirectly drives other gears (43) of other lever controllers (40) at the same time. As the gears (43) rotate, posts (432) on the eccentric axes (431) then rotate and move the sliders (42) along the slide rail (41) by pushing corresponding V-shaped rings (421) since track of the post (432) and shape of the ring (421) differ from each other. Because the first, the second and the third levers (14, 24, 34) are meshed with recesses (420) of the slider (42), the levers (14, 24, 34) then are synchronously activated due to the movements of the sliders (42) and thereby switch all the contacts. Since the gear (43) in the middle position rotates in an opposite way with the other gears (43), on/off actions of the contacts of the second circuit breaker (20) differ from the contacts of the first and the third circuit breakers (10, 30). Therefore when contacts of the second circuit breaker (20) are turned off, contacts of the first and the second circuit breakers (10, 30) are turned on, and vice versa.

Figure 8:
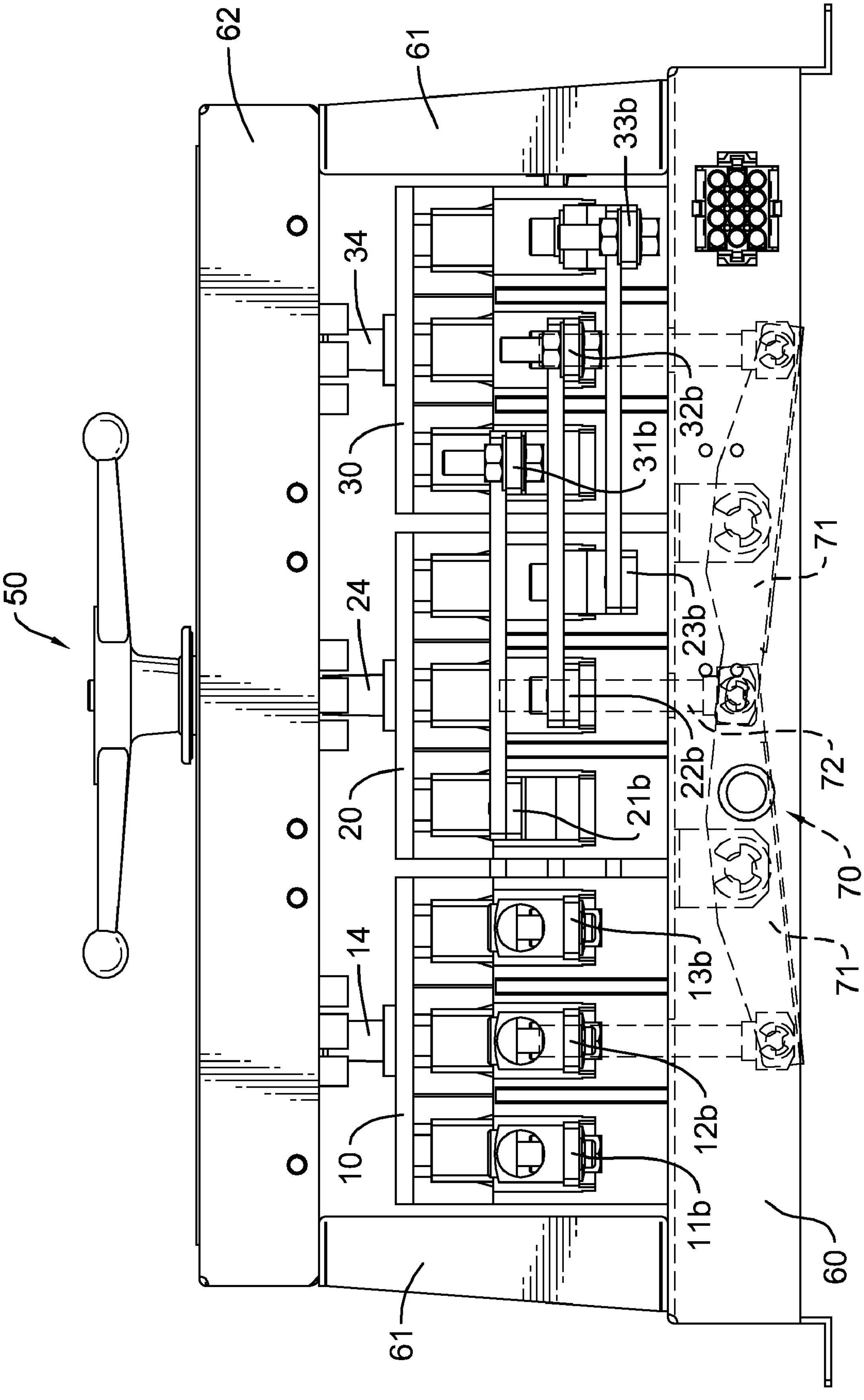
FIG. 8 is a front view of the switching device in FIG. 3 showing another operational status of the switch brake assembly with broken lines.
Figure 9:
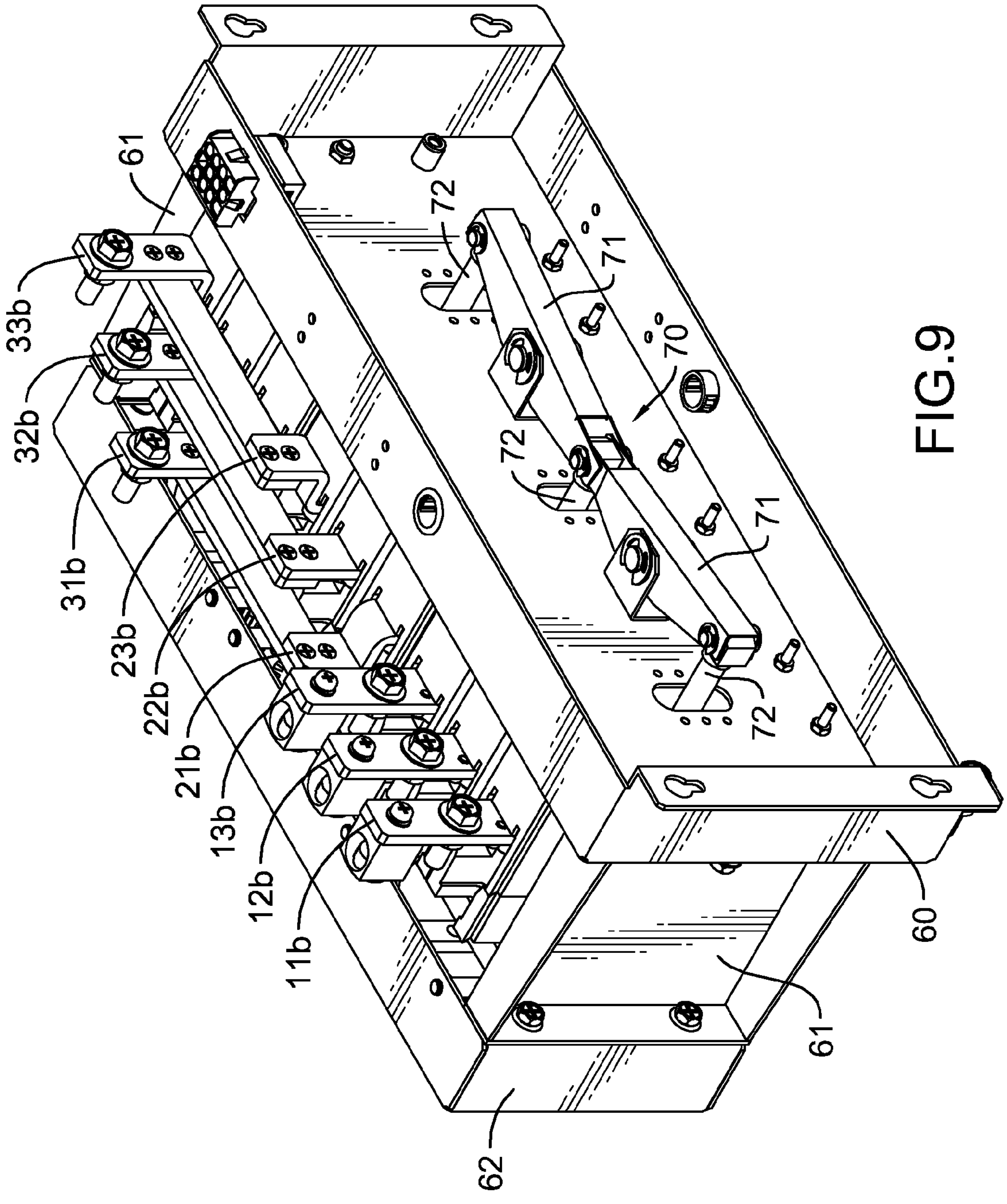
FIG. 9 is a bottom view of the switching device in FIG. 3.
Figure 10:
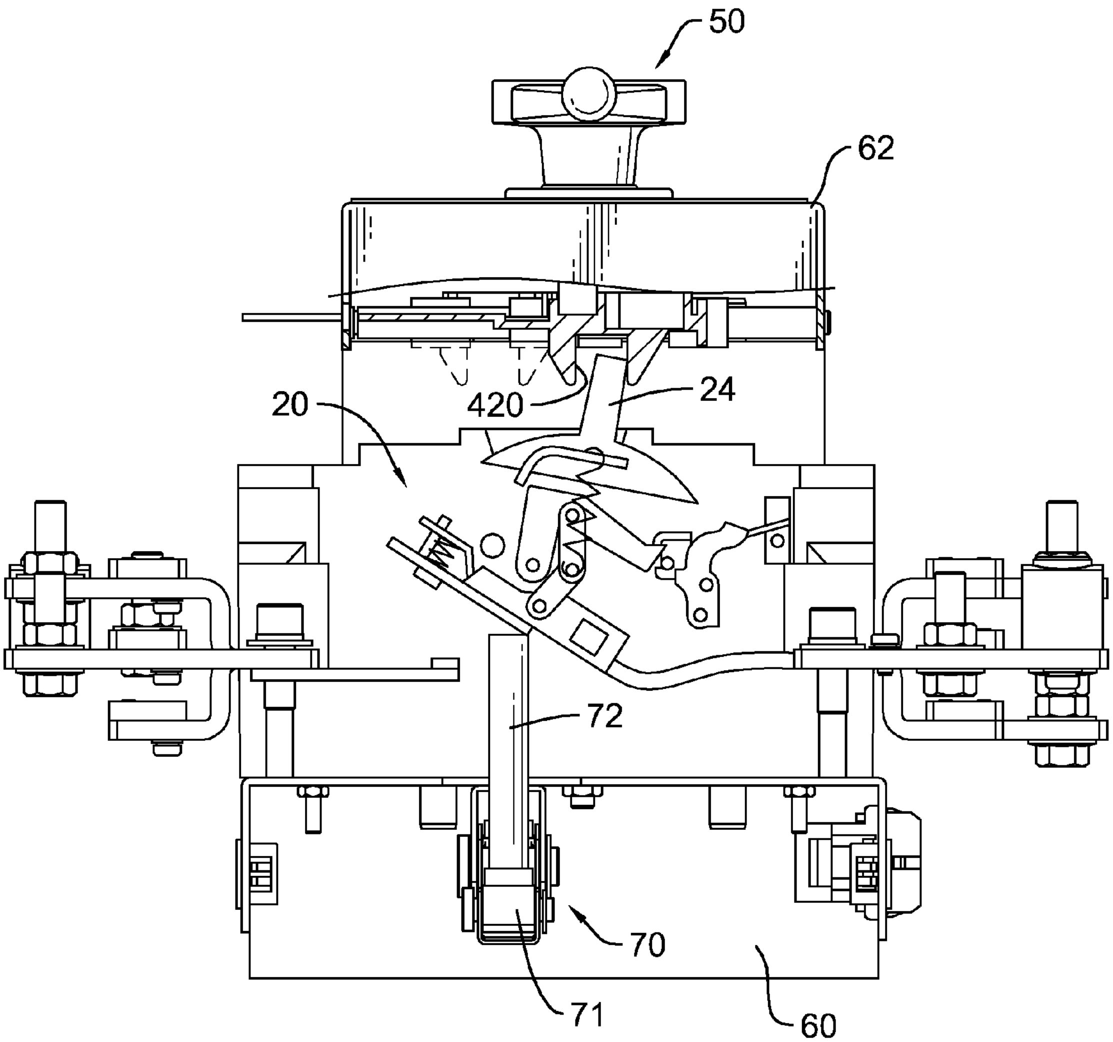
FIG. 10 is a cross sectional side view of the switching device in FIG. 3.

With further reference to FIGS. 8, 9 and 10, the switching device may further has a brake assembly (70) mounted on a bottom of the base (60) and having two cross bars (71) and three brake shafts (72). Each cross bar (71) has a close end and a far end. The cross bars (71) are pivotally connected to each other at the close ends. The brake shafts (72) are respectively and pivotally connected to the far ends and the close ends of the cross bars (71) and respectively extend into the circuit breakers (10, 20, 30) and correspondingly contact with bottoms of the contacts.

Figure 11:
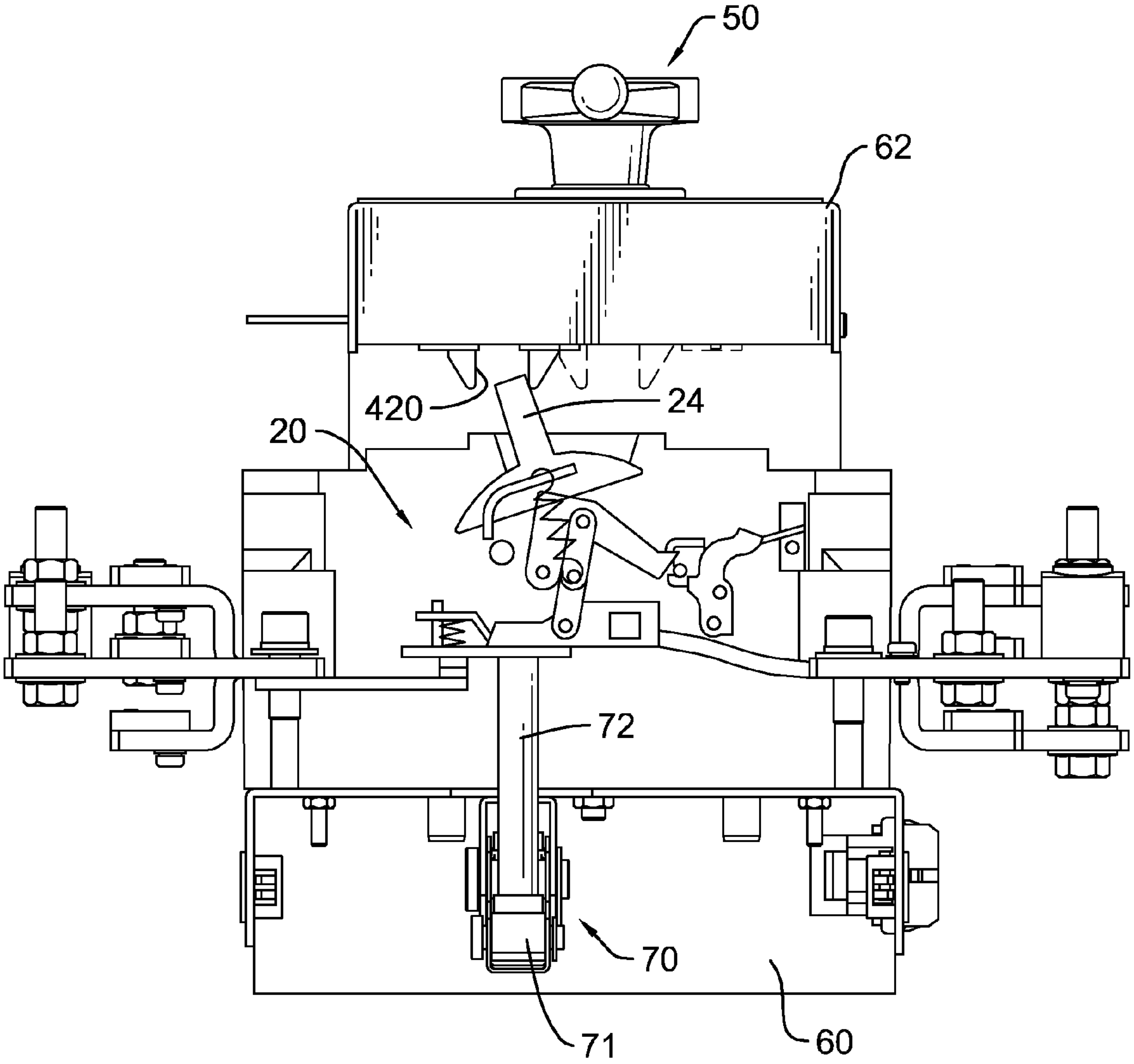
Figure 12:
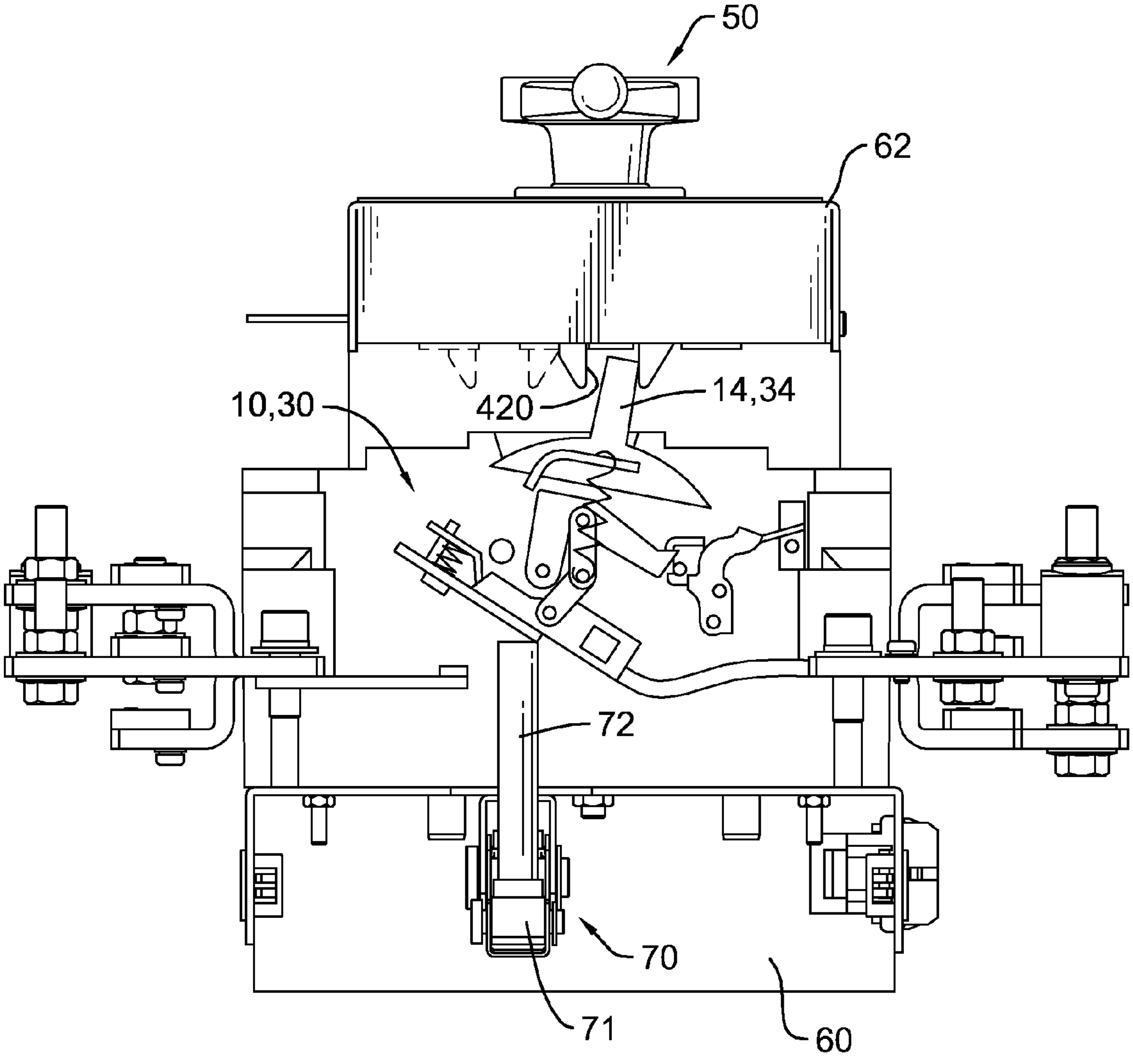
FIG. 12 is a cross sectional side view of the switching device showing relative positions between a brake shaft and a circuit breaker when contact of the circuit breaker is turned off.

With further reference to FIG. 11, when contacts of the second circuit breaker (20) are turned on, brake shaft (72) corresponding to the second circuit breaker (20) is pressed by the mechanism of the second circuit breaker (20) and moves downward. With reference to FIG. 12, brake shafts (72) corresponding to the first and the third circuit breakers (10, 30) then move upward against the contacts of the first and the third circuit breakers (10, 30) due to a link relationship among the three brake shafts (72).

Figure 13:
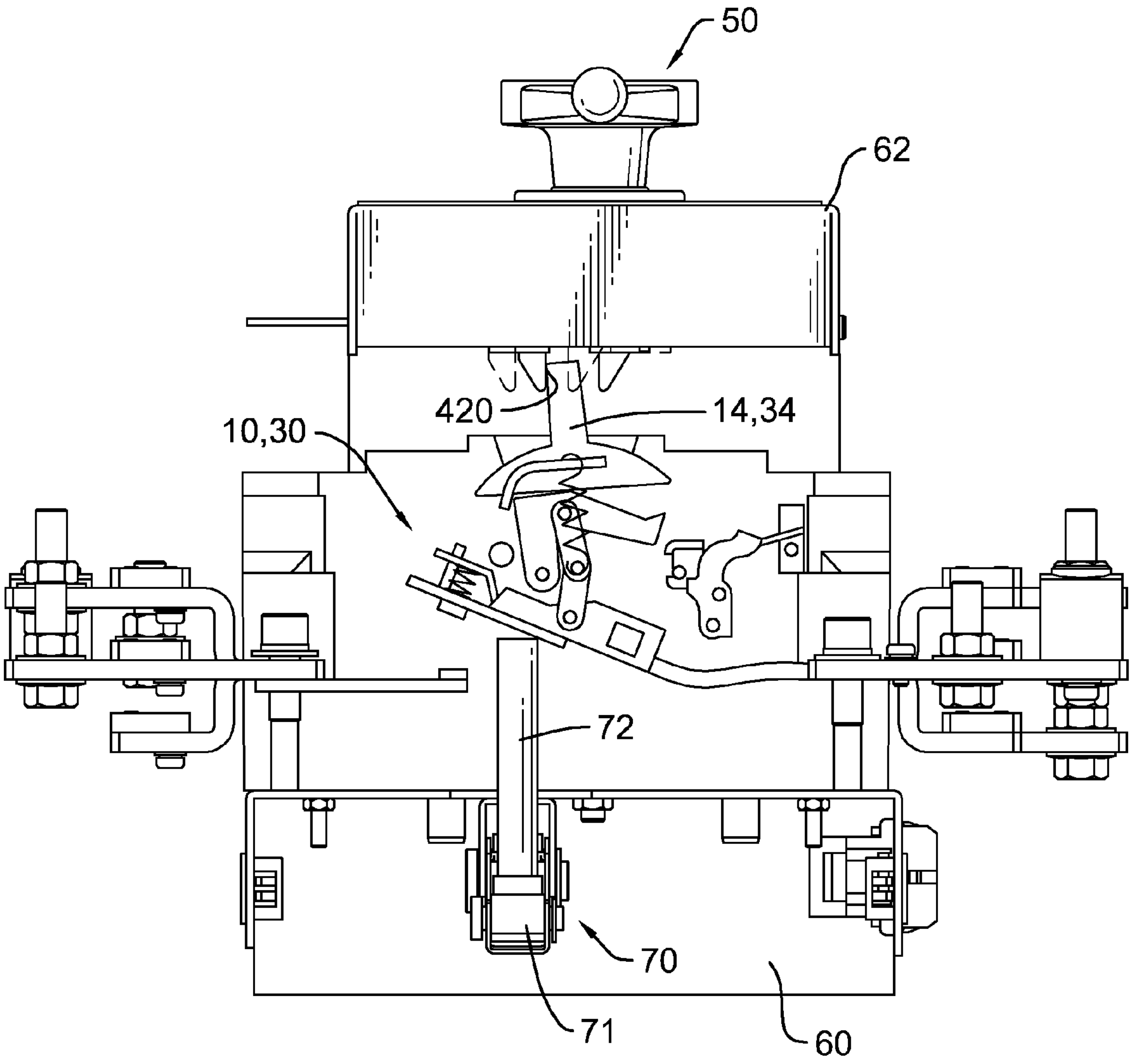
FIG. 13 is a cross sectional side view of the switching device showing relative positions between a brake shaft and a circuit breaker when contact of the circuit breaker is released by external forces.

With further reference to FIG. 13, it is noted that when the mechanism of the turn-off contacts are released by external forces, the corresponding brake shaft (72) may act as an obstacle to prevent the contacts from being turned on and leading to wiring faults.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An armature winding switch module comprising:
a neutral point;
a primary phase line point;
a secondary phase line point;
a tertiary phase line point;
a first connection set connected between the neutral point and the primary phase line point, adapted to connect multiple first armature windings of a power supply device and having
multiple first terminals wherein each two first terminals are respectively connected to two ends of a corresponding first armature winding; and
multiple first contacts connected among the first terminals;
a second connection set connected between the neutral point and the secondary phase line point, adapted to connect multiple second armature windings of said power supply device and having
multiple second terminals wherein each two second terminals are connected to two ends of a corresponding second armature winding; and
multiple second contacts connected among the second terminals; and
a third connection set connected between the neutral point and the tertiary phase line point, adapted to connect multiple third armature windings of the power supply device and having
multiple third terminals wherein each two third terminals are connected to two ends of a corresponding third armature windings;
multiple third contacts connected among the third terminals; and
the first, second and third contacts operating together to synchronously and respectively connect the first, second and third armature windings in series or in parallel.

2. The armature winding switch module as claimed in claim 1, wherein
the power supply unit has two first armature windings, two second armature windings and two third armature windings;
the first connection set has four first terminals and three first contacts;
the second connection set has four second terminals and three second contacts; and
the first connection set has four third terminals and three third contacts.

3. A switching device of the armature winding switch module comprising:
a base;
a first circuit breaker mounted on the base and having
a first contact having a front end and a back end;
a second contact having a front end and a back end;
a third contact having a front end and a back end; and
a first lever synchronously turning on or off the first, the second and the third contacts;
a second circuit breaker mounted on the base beside the first circuit breaker and having
a fourth contact having
a front end connected to the front end of the first contact; and
a back end;

a fifth contact having
a front end connected to the front end of the second contact; and
a back end;
a sixth contact having
a front end connected to the front end of the third contact; and
a back end; and;
a second lever synchronously turning on or off the fourth, the fifth and the sixth contacts wherein the second lever moves opposite to the first lever;
a third circuit breaker mounted on the base beside the second circuit breaker and having
a seventh contact having
a front end; and
a back end connected to the back end of the fourth contact;
an eighth contact having
a front end; and
a back end connected to the back end of the fifth contact;
a ninth contact having
a front end connected to the front ends of the seventh contact and the eighth contact to jointly form a neutral point; and
a back end connected to the back end of the sixth contact; and;
a third lever synchronously turning on or off the seventh contact, the eighth contact and the ninth contact wherein the third lever wherein the third lever moves the same with the first lever;
multiple lever controllers meshing with each other, respectively mounted on the first, the second and the third circuit breakers and respectively controlling the first, the second and the third levers; and
a control handle connected to one of the lever controllers and synchronously driving all the lever controllers.

4. The switching device as claimed in claim 3, wherein each lever controller has
a slide rail;
a slider mounted on and able to slide along the slide rail and having
a top surface;
a bottom surface;
a recess formed on the bottom surface and correspondingly meshed with a corresponding lever; and
a V-shaped ring formed on the top surface of the slider; and
a gear mounted upon the slide rail, being rotatable and having
an axle center;
an eccentric axis formed adjacent to the axle center; and
a post formed on and extending downward from the eccentric axis into the V-shaped ring; and
the control handle is connected to the axle center of one of the gears of the lever controllers and drives the gear by rotation.

5. The switching device as claimed in claim 4, wherein the switching device further has
two side panels respectively mounted on two opposite sides of the base; and
a cover mounted on tops of the side panel and covering the lever controllers and having a through hole; and
the control handle is mounted on the cover, is rotatable and has a shaft mounted through the through hole of the cover and connected to the axle center of one of the gears of the lever controllers.

6. The switching device as claimed in claim 4, wherein the switching device further has a brake assembly mounted on a bottom of the base and having
two cross bars respectively having a close end and a far end and pivotally connected to each other at the close ends; and
three brake shafts respectively connected to the far ends and the close ends of the cross bars and respectively extending into the circuit breakers and correspondingly contacting with bottoms of the contacts.

7. The switching device as claimed in claim 5, wherein the switching device further has a brake assembly being mounted on a bottom of the base and having
two cross bars respectively having a close end and a far end and pivotally connected to each other at the close ends; and
three brake shafts respectively and pivotally connected to the far ends and the close ends of the cross bars and respectively extending into the circuit breakers and correspondingly contacting with bottoms of the contacts.

* * * * *

UNITED STATES PATENT AND TRADEMARK OFFICE

CERTIFICATE OF CORRECTION

PATENT NO. : 8,089,252 B2
APPLICATION NO. : 12/471649
DATED : January 3, 2012
INVENTOR(S) : Wen-Feng Lu It is certified that error appears in the above-identified patent and that said Letters Patent is hereby corrected as shown below:

Title Page, Item 74 (Attorney, Agent, or Firm)

“Fabin & Berdo, P.C.” should be changed to --Rabin & Berdo, P.C.--

Signed and Sealed this
Twenty-fifth Day of December, 2012

David J. Kappos
*Director of the United States Patent and Trademark Office*